US012738042B2

(12) United States Patent
Mao et al.

(10) Patent No.: US 12,738,042 B2
(45) Date of Patent: Sep. 15, 2026

(54) ARTIFICIAL INTELLIGENCE SYSTEM BASED ON SPATIAL-TEMPORAL INFORMATION PAIRS

(71) Applicants: PEKING UNIVERSITY, Beijing (CN); Beijing LongRuan Technologies Inc., Beijing (CN)

(72) Inventors: Shanjun Mao, Beijing (CN); Yingbo Fan, Beijing (CN); Pengpeng Zhang, Beijing (CN)

(73) Assignees: PEKING UNIVERSITY, Beijing (CN); Beijing LongRuan Technologies Inc., Beijing (CN)

( * ) Notice: Subject to any disclaimer, the term of this patent is extended or adjusted under 35 U.S.C. 154(b) by 259 days.

(21) Appl. No.: 18/792,464

(22) Filed: Aug. 1, 2024

(65) Prior Publication Data

US 2025/0363792 A1 Nov. 27, 2025

(30) Foreign Application Priority Data

May 23, 2024 (CN) ......................... 202410643385.7

(51) Int. Cl.
*G06K 9/00* (2022.01)
*G06F 18/21* (2023.01)
(Continued)

(52) U.S. Cl.
CPC ............ *G06V 10/811* (2022.01); *G06F 18/21* (2023.01); *G06F 18/253* (2023.01); *G06N 3/044* (2023.01);
(Continued)

(58) Field of Classification Search
CPC ........ G06V 10/10; G06V 10/12; G06V 10/16; G06V 10/20; G06V 10/24; G06V 10/30;
(Continued)

(56) References Cited

U.S. PATENT DOCUMENTS 12,283,108 B1 * 4/2025 Lim ....................... G06V 20/41
12,430,906 B1 * 9/2025 Lim ....................... G06V 10/82
(Continued)

FOREIGN PATENT DOCUMENTS

CN 115167656 A 10/2022
CN 116489203 A 7/2023
(Continued)

OTHER PUBLICATIONS

Notice of Reasons for Refusal dated Jun. 3, 2025.
CN202410643385.7 first office action dated Jun. 22, 2024.

*Primary Examiner* — Eric Rush
(74) *Attorney, Agent, or Firm* — IPro, PLLC

(57) ABSTRACT

An artificial intelligence system based on spatial-temporal information pairs is provided by the present disclosure. By integrally deploying paired vision, auditory and olfactory acquisition devices, a device that can collect the data within a 720-degree area is constructed, and the multi-dimensional continuous spatial-temporal information pairs such as positions, morphologies, motion states, sounds and odors from the ambient environment of the acquisition device or a same spatial object in the environment are recorded in real time. These information pairs can not only contain spatial relationships and a clock attribute, but also contain rich label attributes, for example, identifiers of acquisition devices, and a name, a category and a behavior pattern of the spatial object.

10 Claims, 2 Drawing Sheets

(51) Int. Cl.

| | |
|---|---|
| ***G06F 18/25*** | (2023.01) |
| ***G06N 3/044*** | (2023.01) |
| ***G06N 3/045*** | (2023.01) |
| ***G06T 7/00*** | (2017.01) |
| ***G06T 7/70*** | (2017.01) |
| ***G06V 10/10*** | (2022.01) |
| ***G06V 10/20*** | (2022.01) |
| ***G06V 10/40*** | (2022.01) |
| ***G06V 10/62*** | (2022.01) |
| ***G06V 10/70*** | (2022.01) |
| ***G06V 10/80*** | (2022.01) |
| ***G06V 20/20*** | (2022.01) |
| ***G06V 20/40*** | (2022.01) |

(52) U.S. Cl.

CPC ............... *G06N 3/045* (2023.01); *G06T 7/70* (2017.01); *G06T 7/97* (2017.01); *G06V 10/16* (2022.01); *G06V 10/20* (2022.01); *G06V 10/40* (2022.01); *G06V 10/62* (2022.01); *G06V 10/70* (2022.01); *G06V 10/806* (2022.01); *G06V 20/20* (2022.01); *G06V 20/41* (2022.01); *G06V 20/44* (2022.01); *G06T 2207/10012* (2013.01)

(58) Field of Classification Search

CPC ...... G06V 10/32; G06V 10/40; G06V 10/454; G06V 10/62; G06V 10/70; G06V 10/72; G06V 10/74; G06V 10/764; G06V 10/80; G06V 10/803; G06V 10/806; G06V 10/811; G06V 10/82; G06V 10/94; G06V 10/98; G06V 20/10; G06V 20/20; G06V 20/40; G06V 20/41; G06V 20/44; G06V 20/46; G06V 20/52; G06V 20/64; G06V 20/70; G06V 2201/07; G06V 2201/10; G06V 2201/12; G06T 7/20; G06T 7/30; G06T 7/50; G06T 7/70; G06T 7/97; G06T 2207/10012; G06T 2207/20081; G06T 2207/20084; G06N 3/008; G06N 3/02; G06N 3/044; G06N 3/0442; G06N 3/045; G06N 3/0464; G06N 3/049; G06F 18/00; G06F 18/10; G06F 18/15; G06F 18/20; G06F 18/21; G06F 18/24; G06F 18/25; G06F 18/251; G06F 18/253; G06F 18/30

USPC ....... 382/100, 103, 106, 153–156, 181, 190, 382/224, 226–229, 254, 260, 274–276, 382/291, 293–296, 302–305, 312, 325; 701/1, 2, 23, 25–28, 117, 300, 301, 400, 701/408, 410, 411, 423; 348/42, 43, 46, 348/47, 61, 113, 116, 118, 119, 121, 135, 348/139, 143, 148, 149, 161, 169–172; 700/1, 9, 28, 29, 31, 47, 48, 61, 71; 706/12, 14, 15, 20, 21, 58, 59, 62

See application file for complete search history.

(56) References Cited

U.S. PATENT DOCUMENTS

| | | | | |
|---|---|---|---|---|
| 2024/0046612 | A1 * | 2/2024 | Panetta ................. | G06T 7/0004 |
| 2024/0169711 | A1 * | 5/2024 | Choudhary .......... | G06V 10/806 |

FOREIGN PATENT DOCUMENTS

| | | | |
|---|---|---|---|
| CN | 117021112 | A | 11/2023 |
| WO | 2011116309 | A1 | 9/2011 |
| WO | 2019133997 | A1 | 7/2019 |
| WO | 2023042412 | A1 | 3/2023 |

* cited by examiner

Omni-directional data acquisition devices are constructed — 1

Multi-dimensional continuous spatial-temporal information pair data in the scene are acquired — 2

Spatial relationships, clock attributes and label attributes are assigned to the spatial-temporal information pairs — 3

Spatial-temporal information pair storage mechanism is established — 4

Fusion analysis processing is performed on the spatial-temporal information pair data to form a three-dimensional processing result or video stream with a depth of field and attribute identifiers — 5

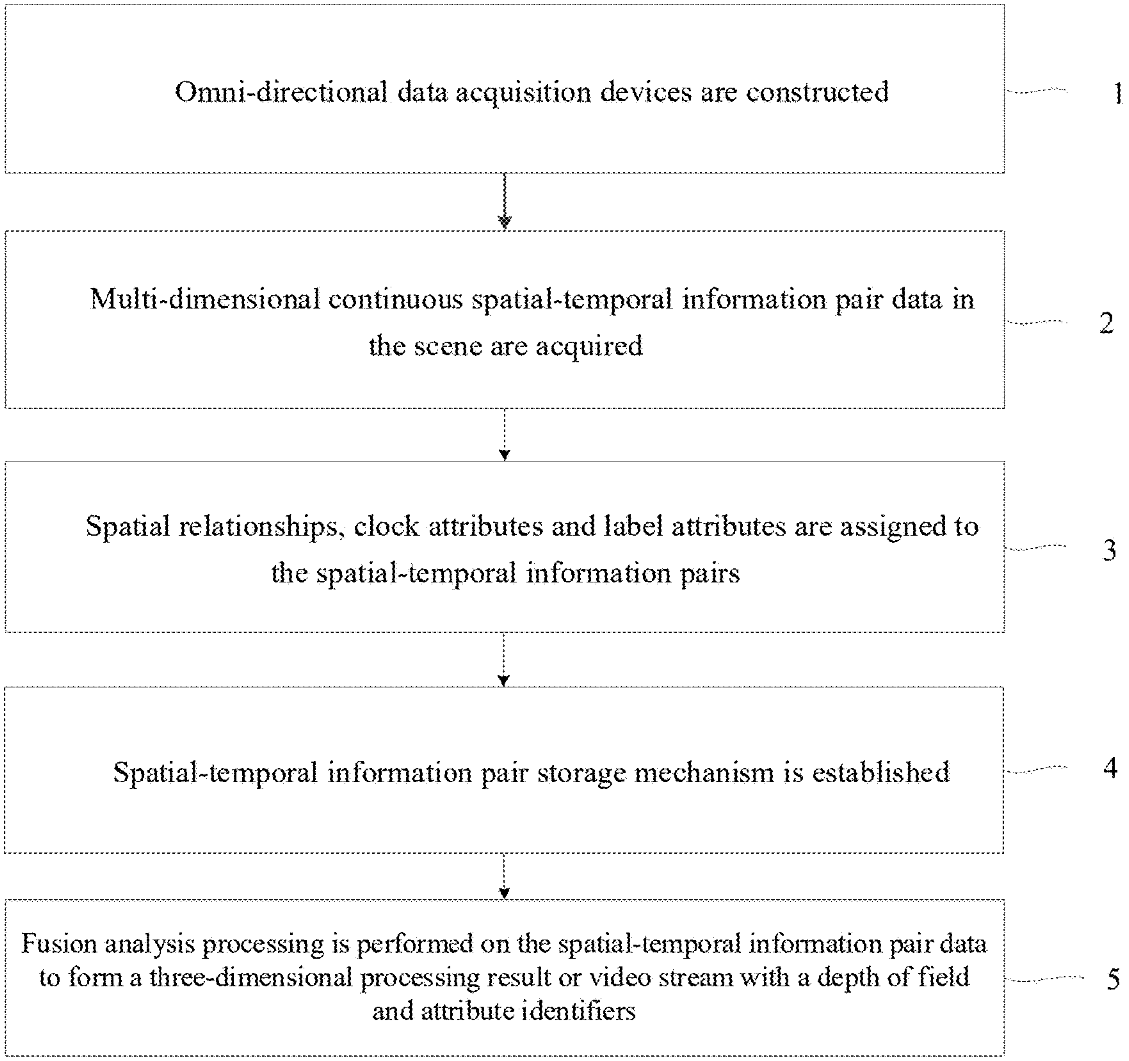

FIG. 2

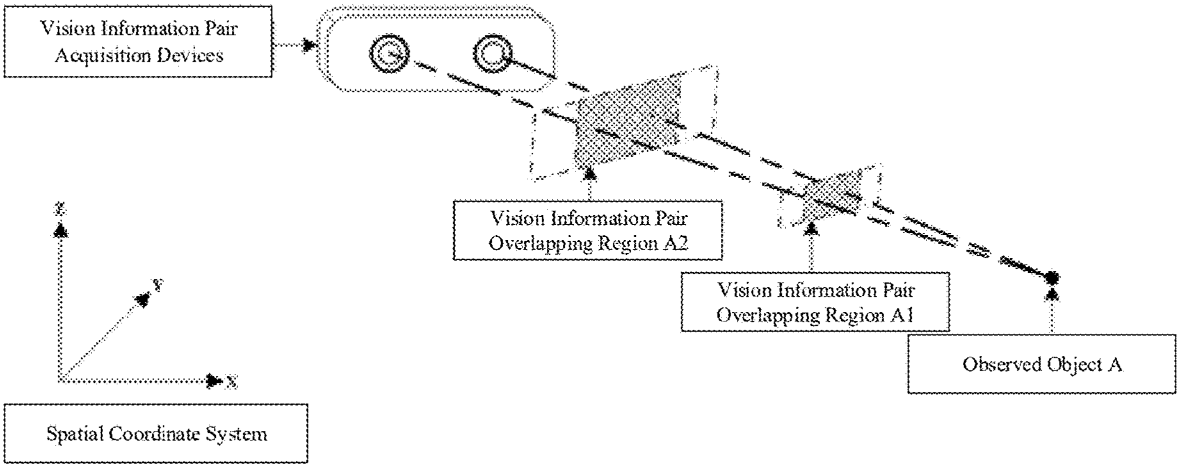

FIG. 3

ARTIFICIAL INTELLIGENCE SYSTEM BASED ON SPATIAL-TEMPORAL INFORMATION PAIRS

TECHNICAL FIELD

The present disclosure relates to the technical field of artificial intelligence and, more particularly, to an artificial intelligence system based on spatial-temporal information pairs.

BACKGROUND

With the rapid development of the related art of artificial intelligence, people are having increasingly higher demands on sensing and data processing of the ambient environment and the target objects in the environment. Meanwhile, the high-efficiency and accurate construction of environment sensing models will facilitate further development and application of humanoid robots, unmanned vehicles, intelligent glasses and various types of automatic inspection and detection devices.

The current environment sensing models are usually constructed by using a single data-information processing method and do not adopt three-dimensional (x, y, z) and four-dimensional (x, y, z, t) spatial-temporal relationship analysis and reconstruction using information pairs. The single data usually provide limited information, which might result in that the sensing models have the problems such as insufficient robustness, lack of complementary information, and difficulty in processing complicated scenes.

Taking vision information processing as an example, some of the methods merely rely on a single two-dimensional image for target identification and prediction, but do not construct a stereo pair of the same object for fusion and analysis of information pairs. That does not only restrict the full comprehension on the target object by the models, but also might result in errors in identification. Furthermore, at different perspectives, the appearances of an object vary significantly, and single visual information cannot capture these variations, thus the accuracy of the sensing is affected.

In addition, the two-dimensional image lacks the depth information, which restricts three-dimensional comprehension on the scene by the models, therefore further reduces the accuracy of the model construction. Although there are some of the methods that employ the technique of stereoscopic vision to capture the images at different angles to acquire the three-dimensional information of objects, they are merely applied to binocular ranging or holographic projection, while the relevant methods do not sufficiently explore the full potential of the spatial-temporal information at different perspectives, and also cannot combine the multimodal information such as the sound feature and the odor feature to assist the analysis. Such a single sensing mode cannot satisfy the current requirements on environment sensing models by artificial intelligence. Especially, in application scenes that require high accuracy and robustness, for example, in complex environments such as humanoid robots, unmanned vehicles, intelligent glasses and industrial inspection, the environment sensing models are required to be capable of processing various types of objects and events, and at the same time are required to be capable of adapting for various environmental changes, such as illumination, weather and shielding. Perception methods based on single information input are often difficult to apply on a large scale in these scenarios, and are unable to provide accurate, stable, and comprehensive perception capabilities.

SUMMARY

In view of the above problems and a fully new awareness, an artificial intelligence system based on spatial-temporal information pairs is provided by the present disclosure.

An artificial intelligence system based on spatial-temporal information pairs is provided by the embodiments of the present disclosure, wherein the system includes a data acquisition end, a data storage end and a data processing end;

the data acquisition end covering 720° spatial object environment is constructed by using data acquisition devices, the data acquisition devices are configured for capturing and recording multi-dimensional data within the 720° spatial object environment in real time to form a series of spatial-temporal information pairs, the data acquisition devices include paired vision acquisition devices, paired auditory acquisition devices and paired olfactory acquisition devices, and the paired vision acquisition devices focus on same direction or same approximate direction to simulate the way when human eyes observe any spatial object at the same time to form stereoscopic image pairs;

the data storage end is configured for storing the spatial-temporal information pairs collected at a same moment in pairs according to time series, and establishing a time-based index simultaneously, so that the spatial-temporal information pairs collected at the same moment form a data format that mutually verifies and complements and satisfies three-dimensional data processing; and the data processing end is configured for processing and analyzing all of the spatial-temporal information pairs in the data storage end, performing synchronization and fusion processing to spatial-temporal information pairs from different types of the data acquisition devices to form a three-dimensional processing result or video stream with depth of field, and identifying and understanding complex patterns and events in the 720° spatial object environment, the complex patterns and events include but are not limited to identification and tracking of the spatial objects and motion states of the spatial objects in a three-dimensional space, understanding and prediction of events, and comprehensive analysis and simulation of the environment.

Optionally, when the paired vision acquisition devices are arranged, they are required to ensure that view fields collected by the paired vision acquisition devices have a sufficient view-field overlapping region, and the paired vision acquisition devices are configured for recording a position, a morphology and a motion state of the 720° spatial object environment or the same spatial object in the 720° spatial object environment in real time to form a vision spatial-temporal information pair;

the paired auditory acquisition devices are configured for recording a sound feature of the 720° spatial object environment or the same spatial object in the 720° spatial object environment in real time to form an auditory spatial-temporal information pair;

the paired olfactory acquisition devices are configured for recording an odor feature of the 720° spatial object environment or the same spatial object in the 720° full-angle spatial object environment in real time to obtain an olfactory spatial-temporal information pair;

the vision spatial-temporal information pair, the auditory spatial-temporal information pair and the olfactory spatial-temporal information pair of the same moment form the a data form that mutually confirms and complements and satisfies data processing, and are configured to serve the three-dimensional data reconstruction processed by the data processing end;

the paired vision acquisition devices include but are not limited to cameras and laser radars; and the paired auditory acquisition devices include but are not limited to microphones; and the paired olfactory acquisition devices include but are not limited to gas sensors.

Optionally, the paired vision acquisition devices focus in a same direction or in a same approximate direction to form the stereo pair, and the collection frequency is regulated according to different demands;

the paired auditory acquisition devices capture acoustic waves from different directions by using microphones distributed at different positions to realize omni-directional sound-source locating and sound-feature extraction; and the paired olfactory acquisition devices monitor the gas distribution and concentration variation in the environment by using gas sensors deployed at different positions to identify and track the source and the diffusion path of specific gas.

Optionally, the spatial-temporal information pairs include spatial relationship;

the spatial relationships refer to topological spatial relationship, a sequence spatial relationship and a metric spatial relationship between spatial objects, wherein the topological spatial relationship refers to relationships of association, adjacency, inclusion, intersection, overlap and separation between the spatial objects;

the sequence spatial relationship refers to the arrangement sequence of the spatial objects or events in space, and includes front and rear, left and right, top and bottom, and an azimuth relationship of east, west, south and north; and the metric spatial relationship refers to a distance or far-near relationship between the spatial objects.

Optionally, the spatial-temporal information pairs further include a clock attribute; and the clock attribute refers to a time identifier that is assigned to the same moment by the spatial-temporal information pairs collected at the same moment, a method of giving the time identifier includes but is not limited to embedding a time stamp into each of the spatial-temporal information pairs, the time stamp includes but is not limited to a year, a month, a day, an hour, a minute, a second and a millisecond, and the time stamp is used to record an exact moment of the collection of the multi-dimensional data, and provide accurate reference in a plurality of time dimensions for subsequent data processing and analyzing.

Optionally, the spatial-temporal information pairs further include a label attribute;

the label attribute includes but is not limited to identifier information of a device that the collected multi-dimensional data belongs to, and information of a name or category, a behavior pattern, a scene state, a sound feature and an odor type of the spatial object; and the label attribute provides deep-level semantic information for the spatial-temporal information pairs, so that the data processing end can understand and analyze scene information in detail.

Optionally, the data storage end is configured for storing the spatial-temporal information pairs collected at the same moment in pairs, the particular storing mode includes but is not limited to storing in two neighboring stacks according to the time series, each of time identifiers contains one paired data item, the storage architecture includes but is not limited to a distributed storage architecture, all of the spatial-temporal information pairs are stored in a distributed manner on multiple nodes of the distributed storage architecture, and each of the nodes independently processes the spatial-temporal information pairs, so that parallel processing and load balancing of the spatial-temporal information pairs are realized.

Optionally, a method of data storage of the spatial-temporal information pairs includes but is not limited to a data organizing method based on complex key-value pairs, the complex key includes the spatial-object identifier, the collection-time identifier and multiple feature labels of the spatial-temporal information pairs, and the feature labels are generated from label attributes contained in the spatial-temporal information pairs; the complex value represents the corresponding spatial-temporal information pair, includes but is not limited to multimodal data presentation, contextual analysis and relevance analysis, and supports multi-dimensional high-efficiency data inquiry and retrieval.

Optionally, the data processing end processes and analyzes all the spatial-temporal information pairs in the data storage end by using artificial intelligence, wherein a method of the processing and analyzing includes but is not limited to deep learning and machine vision; and the method of the processing and analyzing all the spatial-temporal information pairs in the data storage end by using the artificial intelligence includes:

data pre-processing, including cleaning the collected multi-dimensional spatial-temporal information pairs, removing noise and irrelevant information, performing standardization processing to the vision spatial-temporal information pair, the auditory spatial-temporal information pair and the olfactory spatial-temporal information pair, and correcting the stereo pairs;

spatial-temporal synchronization, including ensuring that data captured by different types of the data acquisition devices are synchronous in time, and aligning the data from different types of the data acquisition devices to ensure consistency of the data in space;

multimodal data fusion, including the reconstruction of three-dimensional (x, y, z) and four-dimensional (x, y, z, t) spatiotemporal relationship analysis in the form of information pairs, the feature extraction of visual, auditory and olfactory spatiotemporal information pairs using deep learning models, and combining feature information of different modalities through fusion algorithms to form a richer representation;

three-dimensional reconstruction, including but not limited to, by using a stereo-matching algorithm, extracting depth information from the stereo pair, and, by referring to the depth information and vision data, reconstructing objects and scenes in the three-dimensional space to form the three-dimensional model or the video stream with the depth of field;

object recognition and tracking, including tracking the motion state of the identified objects using target detection algorithms and tracking algorithms;

event comprehension and prediction, including, by analyzing behavior patterns of objects and environmental changes, understanding occurrence and development of events, or predicting a future event by using sequence predicting models;

environment analysis and simulation, including comprehensively analyzing the multi-dimensional spatial-temporal information pairs, comprehensive analysis of the environment, and simulation of the environment using a simulation technology to provide an interactive experience; and decision support, including, based on a result of the processing and analyzing, providing decision support for the artificial intelligence system.

Optionally, the data processing end is further configured for historical-data backtracking of spatial objects, and matching analyzing, self-learning and optimization of new data and old data to realize continuously learning from the new data to update and optimize algorithms and models of the data processing end; and the data processing end is further configured for, based on the processing and analyzing all of the spatial-temporal information pairs in the data storage end, actively finding abnormalities and errors in the spatial-temporal information pairs, and repairing or reporting the abnormalities and errors to ensure quality and reliability of the data.

In the artificial intelligence system based on the spatial-temporal information pairs provided by the present disclosure, the data acquisition end covering 720° spatial object environment is constructed by using data acquisition devices, and the data acquisition devices are configured for capturing and recording multi-dimensional data in the 720° spatial object environment in real time to form a series of spatial-temporal information pairs.

The data storage end stores the spatial-temporal information pairs collected at the same moment in pairs and according to the time series, and establishes a time-based index at the same time, so that the spatial-temporal information pairs collected at the same moment form a data form that mutually confirms and complements and satisfies data processing.

The data processing end processes and analyzes all of the spatial-temporal information pairs in the data storage end, performs synchronization and fusion processing to the spatial-temporal information pairs from different types of the data acquisition devices to form a three-dimensional processing result or video stream with a depth of field, and identifies and understands complex patterns and events in the 720° spatial object environment, the complex patterns and events include but are not limited to identification and tracking of spatial objects and motion states of the spatial objects in a three-dimensional space, understanding and prediction of events, and comprehensive analysis and simulation of the environment.

In order to solve the problem that the existing or traditional environment sensing systems are not established based on information-pair collection and data processing, thus cannot provide an accurate, stable and comprehensive sensing capacity, an information-pair mode of information collection, storage and processing of the human brain is inventively proposed by the present disclosure. By intensive study, it can be known that what the human brain stores and processes is information pairs at the same moment that have their own attributes or identifiers, such as the sensing data of the two eyes, the two ears, the two nostrils, the upper and lower lips, and the upper and lower teeth, and the human brain does not merely store the data of a single eye, a single ear, a single nostril, the upper or lower lip, and the upper or lower teeth, which is the critical information basis of the generation of the human intelligence or even wisdom.

On the basis of the fully new awareness on the human brain information storage and processing, the devices and the systems are designed by the present disclosure to realize a significant change of the artificial intelligence technology. In other words, the information collected, stored and processed by the human brain exists in pairs, for example, the information such as the binocular vision, the binaural auditory and the binasal olfaction. These information pairs do not only include vision data, auditory data and olfactory data collected at the same moment, but also assign attributes or identifiers such as the particular times to these data.

The artificial intelligence system according to the present disclosure performs three-dimensional (x, y, z) and four-dimensional (x, y, z, t) spatial-temporal relationship analyzing and restructuring by using the spatial-temporal information pairs to provide rich information, improve the robustness of the sensing model, increase the complementary information, reduce the difficulty in processing complicated scenes, and increase the accuracy of the sensing, thereby the current requirements on environment sensing models by artificial intelligence are satisfied. Especially, in application scenes that require high accuracy and robustness, the present disclosure can be applied at a large scale to provide an accurate, stable and comprehensive sensing capacity. The present disclosure can not only achieve high-efficiency comprehension and intelligent response to the environment, but also can provide the possibility of a major breakthrough for the application of the artificial intelligence technology. The present disclosure provides artificial intelligence software and hardware system support for humanoid robots, unmanned vehicles, intelligent glasses, inspection devices and so on, and has a very strong practical applicability.

BRIEF DESCRIPTION OF THE DRAWINGS

By reading the following detailed description of the preferable embodiments, various other advantages and benefits will become clear to a person skilled in the art. The drawings are merely intended to illustrate the preferable embodiments, and are not to be considered as limiting the present disclosure. Furthermore, in the entire drawings, the same reference signs denote the same elements. In the drawings:

FIG. 2 is a flow chart of an artificial intelligence device or system based on information pairs according to an embodiment of the present disclosure; and FIG. 3 is a schematic diagram of the method of target collection of the vision information pairs of an artificial intelligence device or system based on information pairs according to an embodiment of the present disclosure.

DETAILED DESCRIPTION

Figure 1:
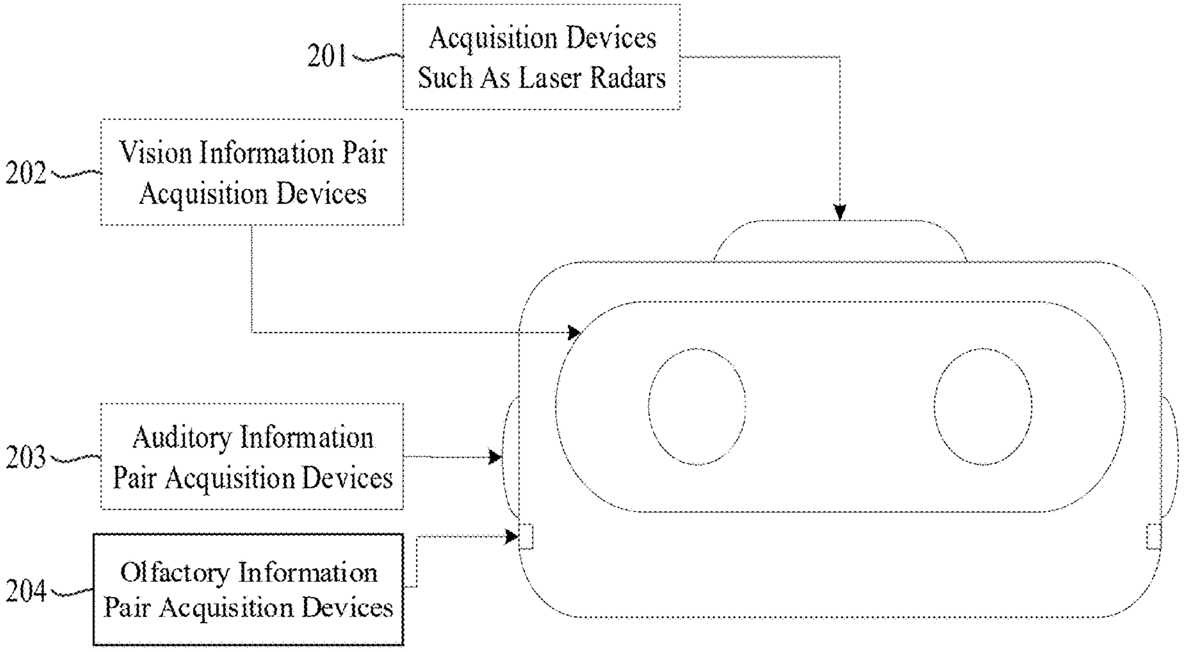
FIG. 1 is a schematic diagram of the deployment of the acquisition devices of an artificial intelligence device or system based on information pairs according to an embodiment of the present disclosure.

In order to make the above purposes, features and advantages of the present disclosure more apparent and understandable, the present disclosure will be described in further detail below with reference to the drawings and the particular embodiments. It should be understood that the particular embodiments described herein are merely intended to interpret the present disclosure, and are merely some embodiments of the present disclosure, rather than all of the embodiments, and they are not intended to limit the present disclosure.

On the basis of a fully new awareness on the information storage and processing by the human brain, an artificial intelligence system based on spatial-temporal information pairs is provided by the present disclosure, wherein the system includes a data acquisition end, a data storage end and a data processing end.

For the data acquisition end, the data acquisition end that rotates similar to the head or the body of a person and covers a 720° spatial object environment is constructed by using data acquisition devices. The 720° full angle refers to 360° in the horizontal direction and 360° in the vertical direction, this is equivalent to covering the entire spatial range with the data acquisition devices as the circle center.

The data acquisition devices are configured for capturing and recording multi-dimensional data in the 720° full-angle spatial object environment in real time to form a series of spatial-temporal information pairs, the data acquisition devices include paired vision acquisition devices, paired auditory acquisition devices and paired olfactory acquisition devices, and the paired vision acquisition devices focus in a same direction or in a same approximate direction to simulate a way when human eyes observe any spatial object at the same time to form a stereo pair. Certainly, more paired acquisition devices may also be added according to practical demands to collect the data in other dimensions, for example, magnetic-electric-field acquisition devices, light-sensation acquisition devices, and laser radars, etc.

In order to better understand the above-described data acquisition devices, referring to FIG. 1, FIG. 1 shows a schematic structural diagram of preferable data acquisition devices according to an embodiment of the present disclosure. The acquisition devices 201, such as laser radars, are disposed at the top, and used to detect the distance. The vision information pair acquisition devices 202 are the paired vision acquisition devices, and they are required to focus in the same direction or in a same approximate direction to simulate the way when human eyes observe any spatial object at the same time to form a stereo pair.

The auditory-information-pair acquisition devices 203 are the paired auditory acquisition devices, which are arranged at both ends, and protrude outwardly. The olfaction-information-pair acquisition devices 204 are the paired olfactory acquisition devices, and are arranged at both ends. It can be understood that the structural diagram shown in FIG. 1 is merely an exemplary structure, the arrangement of the acquisition devices may be diversified, the specific type of acquisition device to be arranged is determined according to practical requirements, and the types are not listed in detail.

Preferably, when the paired vision acquisition devices are arranged, it is necessary to ensure that the view fields collected by the paired vision acquisition devices have a sufficient view-field overlapping region. Such paired vision acquisition devices can excellently record the position, the morphology and the motion state of the 720° full-angle spatial object environment or the same spatial object in the 720° full-angle spatial object environment, in real time, to form a vision spatial-temporal information pair, and the acquisition frequencies of paired vision acquisition devices are regulated according to different demands. The paired vision acquisition devices include but are not limited to cameras, laser radars, etc.

The paired auditory acquisition devices may record the sound feature of the 720° full-angle spatial object environment or the same spatial object in the 720° full-angle spatial object environment, in real time, to form auditory spatial-temporal information pairs. The paired auditory acquisition devices include but are not limited to microphones, and so on. The paired auditory acquisition devices may capture the acoustic waves from different directions by using microphones distributed at different positions to achieve omnidirectional sound-source locating and sound-feature extraction.

The paired olfactory acquisition devices may record the odor feature of the 720° full-angle spatial object environment or the same spatial object in the 720° full-angle spatial object environment, in real time, to form olfactory spatial-temporal information pairs. The paired olfactory acquisition devices include but are not limited to gas sensors, and so on. The paired olfactory acquisition devices may monitor the gas distribution and concentration variation in the environment by using gas sensors deployed at different positions to identify and track the source and the diffusion path of a particular gas.

The vision spatial-temporal information pair, the auditory spatial-temporal information pair and the olfactory spatial-temporal information pair of the same moment form a data form that mutually confirms, complements and satisfies data processing, and are configured to serve for restructuring processing on three-dimensional data by the data processing end.

The spatial-temporal information pairs are required to contain information such as the spatial relationship, the clock attribute and the label attribute, thereby the storage management and the subsequent data processing and analyzing are facilitated. The spatial relationships in the spatial-temporal information pairs refer to a topological spatial relationship, a sequence spatial relationship and a metric spatial relationship between the spatial objects. The topological spatial relationship refers to the relationships of association, adjacency and inclusion between the spatial objects, including the relationships of intersection, overlapping and separation between the spatial objects.

The sequence spatial relationship refers to the arrangement sequence of the spatial objects or events in space, and includes front and rear, left and right, top and bottom, and the azimuth relationship of east, west, south and north. The metric spatial relationship refers to the distance or far-near relationship between the spatial objects.

The clock attribute in the spatial-temporal information pairs refers to a time identifier that is assigned to the same moment by the spatial-temporal information pairs collected at the same moment, the particular method of giving the time identifier includes but is not limited to embedding a time stamp into each of the spatial-temporal information pairs, the time stamp includes but is not limited to a year, a month, a day, an hour, a minute, a second and a millisecond, and the time stamp is used to record the exact moment of the collection of the multi-dimensional data, and provide accurate reference in a plurality of time dimensions for subsequent data processing and analyzing.

The label attribute in the spatial-temporal information pairs includes but is not limited to the identifier information of the device that the collected multi-dimensional data belongs to, and the information of the name or category, the behavior pattern (for example, the behavior pattern of a person in the spatial scene, the behavior patterns of various types of devices such as a robot, and so on), the scene state, the sound feature and the odor type (for example, the hazardous gases such as methane and sulfur dioxide are one odor type, oxygen is another odor type, and so on) of the spatial object. The label attribute provides deep-level semantic information for the spatial-temporal information pairs, so that the data processing end understands and analyzes scene information in detail.

Moreover, the data storage end is configured for storing the spatial-temporal information pairs collected at the same moment in pairs and according to the time series, and establishing a time-based index at the same time, so that the spatial-temporal information pairs collected at the same moment form a data form that mutually confirms and complements and satisfies data processing.

Preferably, the data storage end stores the spatial-temporal information pairs collected at the same moment in pairs according to the time series in two neighboring stacks, each of time identifiers contains one paired data item, the particular storage architecture includes but is not limited to a distributed storage architecture, all of the spatial-temporal information pairs are stored dispersedly in a plurality of nodes of the distributed storage architecture, and each of the nodes independently processes the spatial-temporal information pairs, thereby parallel processing and load balancing of the spatial-temporal information pairs are achieved.

Regarding the particular storage, a preferable selection is that the data storage of the spatial-temporal information pairs employs a data organizing method based on complex key-value pairs, the complex key contains a spatial-object identifier, a collection-time identifier and multiple feature labels of the spatial-temporal information pairs, and the feature labels are generated from label attributes contained in the spatial-temporal information pairs. The complex value represents the corresponding spatial-temporal information pair, and includes but is not limited to multimodal data presentation (i.e., record of the combination of the spatial-temporal information pairs such as vision, auditory and olfaction), contextual analysis, relevance analysis (record of the relevance between the data) and so on, thereby multi-dimensional high-efficiency data inquiry and retrieval are effectively supported.

The data processing end is configured for processing and analyzing all of the spatial-temporal information pairs in the data storage end, performing synchronization and fusion processing to the spatial-temporal information pairs from different types of the data acquisition devices to form a three-dimensional processing result or video stream with a depth of field, and identifying and understanding complex patterns and events in the 720° full-angle spatial object environment, wherein the complex patterns and events include but are not limited to identification and tracking of spatial objects and motion states of the spatial objects in a three-dimensional space, understanding and prediction of events, and comprehensive analysis and simulation of the environment.

Preferably, the data processing end processes and analyzes all of the spatial-temporal information pairs in the data storage end by using artificial intelligence, wherein the method of the processing and analyzing includes but is not limited to deep learning, machine vision, and so on. The method for the data processing end to process and analyze all of the spatial-temporal information pairs in the data storage end by using the artificial intelligence includes:

Firstly, data pre-processing is performed, including cleaning the collected multi-dimensional spatial-temporal information pairs, removing noise and irrelevant information, performing standardization processing to the vision spatial-temporal information pair, the auditory spatial-temporal information pair and the olfactory spatial-temporal information pair, and correcting the stereo pair.

After the data pre-processing, spatial-temporal synchronization is performed, including ensuring that the data that are captured by different types of the data acquisition devices are synchronous in time, and aligning the data of the different types of the data acquisition devices to ensure the consistency of the data in space.

After the spatial-temporal synchronization, multimodal data fusion is performed, by performing three-dimensional (x, y, z) and four-dimensional (x, y, z, t) spatial-temporal relationship analyzing and restructuring by using information pairs, including performing feature extraction to vision spatial-temporal information pairs, auditory spatial-temporal information pairs and olfactory spatial-temporal information pairs by using deep-learning model, for example, a convolutional neural network, a recurrent neural network and so on, and by using a fusion algorithm, for example, weighted averaging, decision-making-layer fusion and feature-layer fusion, combining feature information of different modalities to form richer representation.

After the multimodal data fusion, three-dimensional reconstruction is performed, which includes using stereo-matching algorithms, for example, block matching, or a stereo matching network based on deep learning, to extract depth information from the stereo pair, and, by referring to the depth information and vision data, reconstructing objects and scenes in the three-dimensional space to form a three-dimensional model or video stream with depth of field.

After the three-dimensional reconstruction has been completed, object recognition and tracking are performed, which includes using target detecting algorithms, for example, YOLO or SSD, to identify an object in space, and using a tracking algorithms, for example, Kalman filtering or deep-learning trackers, to track the motion state of an identified object.

After the object recognition and tracking has been implemented, event comprehension and prediction are performed, which includes analyzing the behavior pattern of an object and environmental change, understanding occurrence and development of an event, or predicting a future event by using a sequence predicting models, for example, a long-short-term memory network or the Transformer model.

After the event comprehension and prediction, environment analysis and simulation are performed, including comprehensively analyzing the multi-dimensional spatial-temporal information pairs, fully analyzing the environment includes analyzing the factors such as illumination, sound and odor, and by using simulation technique, for example, virtual reality or augmented reality, simulating the environment to provide an interactive experience.

Finally, decision support is performed, including, based on a result of the processing and analyzing, providing decision support for the entire artificial intelligence system, for example, path planning, abnormality detection or resource allocation.

In addition, the data processing end is further configured for historical-data backtracking of the spatial objects, and matching analyzing, self-learning and optimization of new data and old data to realize continuously learning from the new data to update and optimize the algorithms and the models of the data processing end. The data processing end is further configured for, based on the processing and analyzing all of the spatial-temporal information pairs in the data storage end, actively finding abnormalities and errors in the spatial-temporal information pairs, and repairing or reporting the abnormalities and errors to ensure the quality and the reliability of the data. The capacity of self-learning and error correction of the entire artificial intelligence system are achieved, and the intellectualization of the artificial intelligence system is further enhanced.

The entire process of the artificial intelligence system based on spatial-temporal information pairs from the construction to data processing and analysis can be summarized as follows by using FIG. 2.

Step 1, omni-directional data acquisition devices are constructed.

An environmental data acquisition end that can perform data collection with 720° full-angle coverage is constructed by using vision data acquisition devices, auditory data acquisition devices and olfactory data acquisition devices, in which the layout of each acquisition device can be adjusted according to requirements, and is not limited to the layout shown in FIG. 1.

Step 2, multi-dimensional continuous spatial-temporal information pair data in the scene are acquired.

After the construction of the data acquisition devices is completed, the multi-dimensional data in the 720° scene are captured and recorded in real time by using the data acquisition devices to form a series of spatial-temporal information pairs. Paired vision acquisition devices need to focus in a same direction or in a same approximate direction to simulate the way when human eyes observe any spatial object at the same time to form a stereo pair. For example, referring to FIG. 3, FIG. 3 is a schematic structural diagram showing that exemplary paired vision acquisition devices acquire an acquisition target. Vision information pair acquisition devices (that is, the paired vision acquisition devices) acquire data from the observed object A, and obtain a stereo pair by acquiring a vision information pair overlapping region A1 and a vision information pair overlapping region A2. Its spatial coordinate system is shown in FIG. 3.

Step 3, spatial relationships, clock attributes and label attributes are assigned to the spatial-temporal information pairs.

The spatial-temporal information pairs need to be assigned information such as spatial relationships, clock attributes and label attributes after obtaining the spatial-temporal information pairs. The spatial relationships include topological spatial relationships, sequence spatial relationships and metric spatial relationships. The clock attributes refer to assigning a time identifier of the same moment to vision, auditory and olfactory data pairs collected at the same moment. The label attributes include not only identifier information of devices to which the acquired data sources belong, but also include, but are not limited to, information such as names, categories and behavior patterns of the spatial objects, human behaviors and device behaviors.

Step 4, a spatial-temporal information pair storage mechanism is established.

After the first three steps are completed, the data are stored by the data storage end. In terms of data storage, the spatial-temporal information pairs collected at the same moment are organized and stored in pairs, so that the information pairs can mutually confirm and complement and satisfy three-dimensional data processing.

Step 5, fusion analysis processing is performed on the spatial-temporal information pair data to form a three-dimensional processing result or video stream with depth of field and attribute identifier.

After the spatial-temporal information pair data is stored, the data processing end performs final processing and analysis on the data. In terms of data processing, synchronization and fusion processing are performed on the spatial-temporal information pairs from different types of the devices according to the multi-dimensional spatial-temporal information pair data by using data processing and analyzing methods such as artificial intelligence, for example, the techniques of deep learning and machine vision to form a three-dimensional processing result or video stream with the depth of field; and complex patterns and events in the scene are identified and understood, including but not limited to identification and tracking of spatial objects and motion states of the spatial objects in a three-dimensional space, understanding and prediction of events, and comprehensive analysis and simulation of the environment.

The five steps summarized above can be understood clearly by referring to the above contents, and are not discussed further.

In conclusion, in the artificial intelligence system based on the spatial-temporal information pairs according to the present disclosure, the data acquisition end covering a 720° full-angle spatial object environment is constructed by using the data acquisition devices, and the data acquisition devices are configured for capturing and recording multi-dimensional data in the 720° full-angle spatial object environment in real time to form a series of spatial-temporal information pairs.

The data storage end stores the spatial-temporal information pairs collected at the same moment in pairs and according to the time series, and establishes a time-based index at the same time, so that the spatial-temporal information pairs collected at the same moment form a data form that mutually confirms and complements and satisfies data processing.

The data processing end processes and analyzes all of the spatial-temporal information pairs in the data storage end, performs synchronization and fusion processing to the spatial-temporal information pairs from different types of the data acquisition devices to form a three-dimensional processing result or video stream with a depth of field, and identifies and understands complex patterns and events in the 720° full-angle spatial object environment, the complex patterns and events include but are not limited to recognition and tracking of spatial objects and motion states of the spatial objects in a three-dimensional space, understanding and prediction of events, and comprehensive analysis and simulation of the environment.

For the problem that the perception methods based on single information input are often difficult to apply on a large scale in these scenarios, and are unable to provide accurate, stable, and comprehensive perception capabilities, the present disclosure inventively employs the mode of information collection, storage and processing of the human brain. In other words, the information collected, stored and processed by the human brain exists in pairs, for example, the information such as the binocular vision, the binaural auditory and the binasal olfaction. These information pairs not only include visual data, auditory data and the olfactory data collected at the same moment, but also assign particular attributes or identifiers to these data.

The artificial intelligence system according to the present disclosure performs three-dimensional (x, y, z) and four-dimensional (x, y, z, t) spatial-temporal relationship analyzing and restructuring by using the spatial-temporal information pairs to provide rich information, improve the robustness of the sensing model, increase the complementary information, reduce the difficulty in processing complicated scenes, and increase the accuracy of the sensing, thereby the current requirements on environment sensing models by artificial intelligence are satisfied. Especially, in application scenes that require high accuracy and robustness, the present disclosure can be applied at a large scale to provide an accurate, stable and comprehensive sensing capacity. The present disclosure cannot only achieve high-efficiency comprehension and intelligent response to the environment, but also can provide the possibility of a major breakthrough for the application of the artificial intelligence technology. The present disclosure provides artificial intelligence software and hardware system support for the humanoid robots, the unmanned vehicles, the inspection devices and so on, and has a high practical applicability.

Although preferable embodiments of the embodiments of the present disclosure have been described, once people skilled in the art have known the essential inventive concept, they may make further variations and modifications on these embodiments. Therefore, the appended claims are intended to be interpreted as including the preferable embodiments and all of the variations and modifications that fall within the scope of the embodiments of the present disclosure.

Finally, it should also be noted that, in the present text, relation terms such as first and second are merely intended to distinguish one entity or operation from another entity or operation, and that does not necessarily require or imply that these entities or operations have therebetween any such actual relation or order. Furthermore, the terms “include”, “contain” or any variants thereof are intended to cover non-exclusive inclusions, so that processes, methods, articles or terminal devices that include a series of elements do not only include these elements, but also include other elements that are not explicitly listed, or include the elements that are inherent to such processes, methods, articles or terminal devices. Unless further limitation is set forth, an element defined by the wording “including a . . . ” does not exclude additional same element in the process, method, article or terminal device including the element.

The embodiments of the present disclosure are described above with reference to the drawings. However, the present disclosure is not limited to the above particular embodiments. The above particular embodiments are merely illustrative, rather than limitative. A person skilled in the art, under the motivation of the present disclosure, can make many variations without departing from the spirit of the present disclosure and the protection scope of the claims, and all of the variations fall within the protection scope of the present disclosure.

The invention claimed is:

1. An artificial intelligence system based on spatial-temporal information pairs, wherein the artificial intelligence system is configured to provide artificial intelligence software and hardware system support for humanoid robots, unmanned vehicles, intelligent glasses and inspection devices, and comprises a data acquisition end, data storage circuitry and data processing circuitry, wherein the data acquisition end covers a 720° spatial object environment and is constructed by using data acquisition devices, the data acquisition devices are configured for capturing and recording multi-dimensional data in the 720° spatial object environment in real time to form a series of spatial-temporal information pairs, the data acquisition devices comprise paired vision acquisition devices, paired auditory acquisition devices and paired olfactory acquisition devices, wherein the paired vision acquisition devices focus in a same direction or in a same approximate direction to simulate how human eyes observe any spatial object at the same time to form a stereo pair;

the data storage circuitry is configured for storing multi-dimensional spatial-temporal information pairs collected at a same moment in pairs and according to a time series, and establishing a time-based index at the same time, so that the multi-dimensional spatial-temporal information pairs collected at the same moment form a data form that mutually confirms and complements and satisfies three-dimensional data processing; and the data processing circuitry is configured for processing and analyzing all of the multi-dimensional spatial-temporal information pairs in the data storage circuitry, performing synchronization and fusion processing to the multi-dimensional spatial-temporal information pairs from different types of the data acquisition devices to form a three-dimensional processing result or video stream with a depth of field, and identifying and understanding complex patterns and events in the 720° spatial object environment, wherein the complex patterns and events comprise identification and tracking of spatial objects and motion states of the spatial objects in a three-dimensional space, understanding and prediction of events, and comprehensive analysis and simulation of the 720° spatial object environment;

the processing and analyzing of all of the multi-dimensional spatial-temporal information pairs in the data storage circuitry comprises:

data pre-processing, comprising cleaning the collected multi-dimensional spatial-temporal information pairs, removing noise and irrelevant information, performing standardization processing to a vision spatial-temporal information pair, an auditory spatial-temporal information pair and an olfactory spatial-temporal information pair, and correcting and processing the stereo pair;

spatial-temporal synchronization, comprising ensuring that data that are captured by the different types of the data acquisition devices are synchronous in time, and aligning the data of the different types of the data acquisition devices to ensure consistency of the data in a spatial-temporal relationship;

multimodal data fusion, by performing three-dimensional (x, y, z) and four-dimensional (x, y, z, t) spatial-temporal relationship analyzing and restructuring by using information pairs, comprising performing feature extraction to the vision spatial-temporal information pair, the auditory spatial-temporal information pair and the olfactory spatial-temporal information pair by using a deep-learning model, and, by using a fusion algorithm, combining feature information of different modalities to form a richer representation;

three-dimensional reconstruction, comprising, by using a stereo-matching algorithm, extracting depth information from the stereo pair, and, by referring to the depth information and vision data, reconstructing objects and scenes in the three-dimensional space to form the three-dimensional processing result or the video stream with the depth of field;

object recognition and tracking, comprising, by using target detecting algorithms and tracking algorithms, tracking a motion state of an identified object;

event comprehension and prediction, comprising, by analyzing a behavior pattern of an object and environmental change, understanding occurrence and development of an event, or predicting a future event by using a sequence predicting model;

environment analysis and simulation, comprising comprehensively analyzing the multi-dimensional spatial-temporal information pairs, fully analyzing the 720° spatial object environment, and, by using a simulation technique, simulating the 720° spatial object environment to provide an interactive experience; and decision support, comprising, based on a result of the processing and analyzing, providing decision support for the artificial intelligence system.

2. The artificial intelligence system according to claim 1, wherein when the paired vision acquisition devices are arranged, it is necessary to ensure that view fields collected by the paired vision acquisition devices have a sufficient view-field overlapping region, and the paired vision acquisition devices are configured for recording a position, a morphology and a motion state of the 720° spatial object environment or a same spatial object in the 720° spatial object environment in real time to form vision spatial-temporal information pairs;

the paired auditory acquisition devices are configured for recording a sound feature of the 720° spatial object environment or the same spatial object in the 720° spatial object environment in real time to form auditory spatial-temporal information pairs;

the paired olfactory acquisition devices are configured for recording an odor feature of the 720° spatial object environment or the same spatial object in the 720° spatial object environment in real time to obtain olfactory spatial-temporal information pairs;

the vision spatial-temporal information pair, the auditory spatial-temporal information pair and the olfactory spatial-temporal information pair of the same moment form the data form that mutually confirms and complements and satisfies the three-dimensional data processing, and are configured to serve for restructuring processing by the data processing circuitry on three-dimensional data;

the paired vision acquisition devices comprise one or more of cameras and laser radars;

the paired auditory acquisition devices comprise microphones; and the paired olfactory acquisition devices comprise gas sensors.

3. The artificial intelligence system according to claim 2, wherein the paired vision acquisition devices focus in the same direction or in the same approximate direction to form the stereo pair, and a collection frequency is regulated according to different demands;

the paired auditory acquisition devices capture acoustic waves from different directions by using microphones distributed at different positions to realize omni-directional sound-source locating and sound-feature extraction; and the paired olfactory acquisition devices monitor gas distribution and concentration variation in the 720° spatial object environment by using gas sensors deployed at different positions to identify and track a source and a diffusion path of a particular gas.

4. The artificial intelligence system according to claim 1, wherein the multi-dimensional spatial-temporal information pairs comprise spatial relationships;

the spatial relationships refer to a topological spatial relationship, a sequence spatial relationship and a metric spatial relationship between the spatial objects, wherein the topological spatial relationship refers to relationships of association, adjacency, inclusion, intersection, overlapping and separation between the spatial objects;

the sequence spatial relationship refers to an arrangement sequence of the spatial objects or events in space, and comprises front and rear, left and right, top and bottom, and an azimuth relationship of east, west, south and north; and the metric spatial relationship refers to a distance or far-near relationship between the spatial objects.

5. The artificial intelligence system according to claim 1, wherein the multi-dimensional spatial-temporal information pairs further comprise a clock attribute; and the clock attribute refers to a time identifier that is assigned to the same moment by the multi-dimensional spatial-temporal information pairs collected at the same moment, a method of giving the time identifier comprises embedding a time stamp into each of the multi-dimensional spatial-temporal information pairs, the time stamp comprises one or more of a year, a month, a day, an hour, a minute, a second and a millisecond, and the time stamp is used to record an exact moment of collection of the multi-dimensional spatial-temporal information pairs, and provide accurate reference in a plurality of time dimensions for subsequent data processing and analyzing.

6. The artificial intelligence system according to claim 1, wherein the multi-dimensional spatial-temporal information pairs further comprise a label attribute;

the label attribute comprises one or more of identifier information of a device that a collected multi-dimensional spatial-temporal information pair belongs to, and information of a name or category, a behavior pattern, a scene state, a sound feature and an odor type of a spatial object; and the label attribute provides deep-level semantic information for the multi-dimensional spatial-temporal information pairs, so that the data processing circuitry understands and analyzes scene information in detail.

7. The artificial intelligence system according to claim 1, wherein the data storage circuitry is configured in a paired storing mode for storing the multi-dimensional spatial-temporal information pairs collected at the same moment in pairs, the paired storing mode comprises storing in two neighboring stacks according to the time series, assigning time identifiers to the multi-dimensional spatial-temporal information pairs, each of the time identifiers comprising one paired data item, a storage architecture comprising a distributed storage architecture, wherein all of the multi-dimensional spatial-temporal information pairs are stored dispersedly in a plurality of nodes of the distributed storage architecture, and each of the plurality of nodes independently processes the multi-dimensional spatial-temporal information pairs, so that parallel processing and load balancing of the multi-dimensional spatial-temporal information pairs are achieved.

8. The artificial intelligence system according to claim 1, wherein a method of data storage of the multi-dimensional spatial-temporal information pairs comprises a data organizing method based on complex key-value pairs, wherein a complex key comprises a spatial-object identifier, a collection-time identifier and a plurality of feature labels of the multi-dimensional spatial-temporal information pairs, and the plurality of feature labels are generated from label attributes contained in the multi-dimensional spatial-temporal information pairs; and wherein a complex value represents a corresponding multi-dimensional spatial-temporal information pair and comprises one or more of multimodal data presentation, contextual analysis and relevance analysis, and multi-dimensional high-efficiency data inquiry and retrieval support.

9. The artificial intelligence system according to claim 1, wherein the data processing circuitry processes and analyzes all of the multi-dimensional spatial-temporal information pairs in the data storage circuitry by using artificial intelligence, wherein the processing and analyzing comprises one or more of deep learning and machine vision.

10. The artificial intelligence system according to claim 1, wherein the data processing circuitry is further configured for historical-data backtracking of spatial objects, and matching, analyzing, self-learning and optimization of new data and old data to realize continuously learning from the new data to update and optimize algorithms and models of the data processing circuitry; and the data processing circuitry is further configured for, based on the processing and analyzing of all of the multi-dimensional spatial-temporal information pairs in the data storage circuitry, actively finding abnormalities and errors in the multi-dimensional spatial-temporal information pairs, and repairing or reporting the abnormalities and errors to ensure quality and reliability of the multi-dimensional spatial-temporal information pairs.

* * * * *